United States Patent

[11] 3,621,001

| [72] | Inventors | Adolf Steinhofer<br>Ludwigshafen/Rhine;<br>Helmut Doerfel, Ludwigshafen/Rhine;<br>Georg Falkenstein, Ludwigshafen/Rhine;<br>Wolfgang-Dieter Jeserich,<br>Lambsheim/Pfalz; Bernd Reichel,<br>Frankenthal/Pfalz, all of Germany |
|---|---|---|
| [21] | Appl. No. | 743,053 |
| [22] | Filed | July 8, 1968 |
| [45] | Patented | Nov. 16, 1971 |
| [73] | Assignee | Badische Anilin-& Soda-Fabrik<br>Aktiengesellschaft<br>Ludwigshafen/Rhine, Rhineland/Pfalz,<br>Germany |
| [32] | Priority | July 6, 1967 |
| [33] | | Germany |
| [31] | | P 17 20 282.3 |

[54] ACCELERATING ANIONIC POLYMERIZATION OF LACTAMS
4 Claims, No Drawings

[52] U.S. Cl.................................................. 260/78 L,
260/78 P
[51] Int. Cl........................................................ C08g 20/18
[50] Field of Search............................................ 260/78 P;
260/78 L

[56] References Cited
UNITED STATES PATENTS
3,304,291  2/1967  Dachs et al. ..................  260/78

*Primary Examiner*—William H. Short
*Assistant Examiner*—L. M. Phynes
*Attorney*—Johnston, O'Keefe, Keil, Thompson & Shurtleff

ABSTRACT: A process for accelerating the base catalyzed polymerization of lactams carried out at temperatures of 80° to 200° C. using N,N'-disubstituted arylenedicarbamoyl lactams as activators.

ACCELERATING ANIONIC POLYMERIZATION OF LACTAMS

This invention relates to a process for accelerating the anionic polymerization of lactams by means of particularly advantageous activators.

It is known that polyamides can be prepared by polymerization of monomeric lactams in the presence of alkaline catalysts, for example alkalimetals such as sodium and potassium, or their basic compounds such as the amines or hydrides, the alkali, lactam compounds or the organometallic compounds of metals of groups Ia to IIIa of the periodic system at temperatures above 200° C.

It is also known that this process, generally known as anionic polymerization, can be carried out in the presence of activators under substantially milder conditions.

Activators which have been used include acylated lactams such as N-acetylcaprolactam, or compounds having an acylating action such as isocyanates, ketenes, acid chlorides, carbodiimides, cyanamides and acid anhydrides, and also compounds which bear sulfonyl, phosphenyl, nitroso, thiocarbonyl or thiophosphenyl radicals.

Because these compounds are effected by water and oxygen, the process should be carried out in an anhydrous medium and in the absence of oxygen. They are therefore not very suitable for the polymerization of technical lactam which always contains small amounts of water.

Carboxylic esters, urethanes and plurally acylated amines have also been used as activators. These compounds are physioligically safer than the above mentioned activators, some of which are strongly corrosive, but their accelerating effect is considerably less.

Finally it is known that anionic polymerization of lactams can be accelerated by compounds according to the formulas $(R)_2N-CX-N(R)_2$, $(R)_2N-CO-OR$ and $(R)_2N-C(=NR)-R$ in which X denotes oxygen, sulfur or the divalent group

and R denotes hydrogen or an organic radical, at least one R attached to nitrogen denoting an organic radical. The active compounds are derived from the parent compounds (urea, thiourea, guanidine, urethane, amidine or isothiourea) by replacing at least one hydrogen atom attached to nitrogen by an organic radical.

In accordance with the present invention a particularly advantageous process for accelerating the anionic polymerization of lactams in the presence of alkaline polymerization catalysts and activators at from 80° to 200° C., in the presence or absence of inert solvents, comprises using as the activator a compound having the general formula:

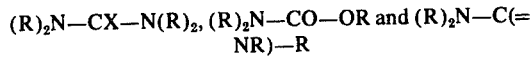

in which $n$ denotes one of the integers from 2 to 11, $R^1$ denotes a divalent aromatic or aliphatic radical having two to 12 carbon atoms, preferably a hydrocarbon radical, and $R^2$ denotes a phenyl radical or an alkyl radical having one to 10 carbon atoms and preferably a hydrocarbon radical. Compounds in which $n$ denotes 5, 6 or 7 are particularly suitable.

It is an advantage of the new activators over the prior art activators that the additives otherwise conventionally used to regulate chain length are unnecessary. Moreover the pot life and K value may be varied widely.

Another advantage of the activators according to the invention is that they yield polyamides which have particularly stable terminal groups. The activators according to this invention involve no health hazards and may therefore be used in the anionic polymerization of lactams without special precautions.

Polymerization may be carried out by known methods. The individual components may be added to the polymerization mixture in any sequence.

The activators to be used according to the invention may be employed in amounts of 0.01 to 15percent, preferably 0.5 to 5 percent, by weight with reference to the weight of the lactam to be polymerized. Amounts outside these limits may be used however for special purposes. Obviously mixtures of these new activators in any proportions may also be used.

The polymerization may be carried out in known manner, advantageously at temperatures of from 80° to 200° C., although for special purposes higher or lower temperatures may be chosen. At the beginning of the polymerization the temperature of the reaction mixture is advantageously from 100° to 160° C.

Known catalysts may be used as the polymerization catalysts, for example alkali metals or alkaline earth metals such as sodium, potassium and calcium, or their basic compounds such as the amides or hydrides, the alkali metal lactam compounds of lactams having 5 to 13 ring members or the organometallic compounds of metals of groups 1a, 2a and 3a of the periodic system (Handbook of Chemistry and Physics, 46th ed., 1965–1966, p. B-3).

Lactams which may be polymerized by this new process have from 5 to 13 ring members particularly pyrrolidone, piperidone, caprolactam, capryllactam, enantholactam, capriclactam, laurolactam, substituted lactams such as epsilon-ethyl-epsilon-caprolactam, zeta-ethyl-zeta-enantholactam or mixtures of the said compounds.

Lactams having 7 to 9 ring members are preferred. Polymerization may be carried out in the presence of inert solvents such as aliphatic and aromatic hydrocarbons or ethers. In this case polyamide powder is obtained which is suitable, for example, for the production of coatings by the fluidized bed method, as fining agents for beverages or as binders for nonwovens.

Soluble or insoluble dyes and fillers of all types may be added to the polymerization mixture provided they do not interfere with the action of the activator-catalyst system. These include the resins customarily used and, among others, inorganic substances such as glass fibers, asbestos, other ceramic materials, graphite, gypsum, chalk, molybdenum disulfide and natural substances such as pretreated sawdust, natural and synthetic fibers, rayon, etc.

The process may be carried out batchwise, for example for the production of moldings having intricate shapes, or continuously, for example in polymerization tubes or polymerization towers having discharge means such as spinning pumps or screws. Tubes, rods, boards, film, sheeting, strip and the like and also yarn, including yarn for tire cord, may be prepared direct by methods which are not claimed per se.

The process according to the invention is also suitable for the production of large blocks of polyamide, of intricate shapes by ordinary casting, centrifugal casting or rotational casting methods, for the production of expanded moldings or corrosion-resistant polyamide coatings, for making viscoelastic intermediate layers, for bonding, jointing and laminating conventional materials. The polyamides obtained may also be granulated and further processed by conventional processing methods, for example injection molded, extruded or spun.

The activators which are used according to the invention are compounds which have not hitherto been described in the literature. The production of bis-(caprolactam-N-carboxylic acid)-N,N'-diphenyl-p-phenylenediamide will therefore now be described:

Half of the equivalent amount of phosgene is passed into a solution of 130 g. (0.5 mole) of N,N'-diphenyl-p-phenylene-diamine in 800 ml. of toluene at 0° to 20° C. The whole is then heated slowly to 60° C. and finally heated under reflux and at the same time the remaining phosgene is passed in so that phosgene gas cannot be detected in the escaping HCl gas.

When all the HCl has been evolved, 113 g. (1 mole) of epsilon-caprolactam and 101 g. (1 mole) of triethylamine are added to the clear toluene solution of the carbamyl chloride (melting point 214° C.) formed and the mixture is thereafter heated under reflux for 6 hours.

The solution is then evaporated, the residue is freed from the hydrochloride of the tertiary base by digesting it several times with cold water, remainders of amine are removed by rinsing with a little ether and the product is finally washed with dilute sodium bicarbonate solution. At the end the whole is washed again with water until it is neutral, and dried at 110° C. The colorless crystals melt at 263° to 264° C. after having been recrystallized once from cyclohexanone.

The following bis-(caprolactam-N-carboxylic acid)-N,N'-dialkyl-or diphenyl-p-arylenediamides and the other activators of the formula given above may be prepared analogously:

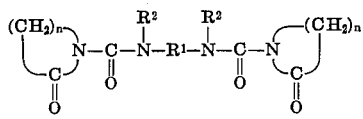

| No. | R¹ | R² | n | Melting point, ° C. |
| --- | --- | --- | --- | --- |
| 1 | p-Phenylene | Secondary butyl | 5 | 227 |
| 2 | 4,4'-biphenylene | Phenyl | 5 | 247–249 |

The invention is illustrated by the following examples. The parts and percentages specified in the following examples are by weight.

EXAMPLE 1

43 parts of caprolactam and 7 parts of a 17 percent solution of sodium caprolactam in caprolactam are fused together and intensely mixed at 120° C. with a solution of 2.7 parts of bis-(caprolactam-N-carboxylic acid)-N,N'-diphenyl-p-phenylenediamide in 48.1 parts of caprolactam. The mixture then begins to polymerize. It is viscous after 1 minute 42 seconds and solid after 2 minutes 24 seconds. The temperature of the mixture rises in 2 minutes 12 seconds to 170° C. The polymer has an extract content of 4.3 percent. The K value cannot be measured because the polymer does not dissolve completely in 96 percent sulfuric acid.

EXAMPLE 2

The starting materials used in example 1 are intensely mixed at 150° C. The mixture then begins to polymerize. It is viscous after 24 seconds and solid after 2 minutes 18 seconds. The temperature of the mixture rises in 36 seconds to 200° C. The polymer has an extract content of 7.6 percent. The K value cannot be measured because the polymer is not completely soluble in 96 percent sulfuric acid.

EXAMPLE 3

43 parts of caprolactam and 7 parts of a 17 percent solution of sodium caprolactamate in caprolactam are fused together and intensely mixed at 120° C with a solution of 3.0 parts of bis-(caprolactam-N-carboxy-lic acid)-N,N'-diphenyl-biphenylenediamide-4,4'- in 48.1 parts of caprolactam. The mixture begins to polymerize. After 1 minute 54 seconds it is viscous and after 2 minutes 24 seconds it is solid. The temperature of the mixture rises to 170° C. in 2 minutes 24 seconds. The polymer has an extract content of 5.4 percent. The K value cannot be measured because the polymer is not completely soluble in 96 percent sulfuric acid.

EXAMPLE 4

The starting materials used in example 1 are intensely mixed at 150° C. The mixture then begins to polymerize. It is viscous after 24 seconds and solid after 2 minutes 48 seconds. The temperature of the mixture rises to 200° C. in 1 minute 18 seconds. The polymer has an extract content of 6.7 percent. The K value cannot be measured because the polymer is not completely soluble in 96 percent sulfuric acid.

EXAMPLE 5

43 parts of caprolactam and 7 parts of a 17 percent solution of sodium caprolactamate in caprolactam are fused together and mixed intensely at 150° C. with a solution of 2.5 parts of bis-(caprolactam-N-carboxy-lic acid)-N,N'-di-secbutyl-p-phenylenediamide in 48.1 parts of caprolactam. The mixture is immediately thereafter placed in a cylindrial mold having a diameter of 50 mm. and a height of 100 mm. in which it begins to polymerize. It is viscous after 3 minutes and solid after 4 minutes 18 seconds. The temperature of the mixture rises to 199° C. in 5 minutes. After another 30 seconds the molding is removed from the mold. The polymer has an extract content of 4.6 percent. The K value cannot be measured because the polymer is not completely soluble in 96 percent sulfuric acid.

We claim:

1. In a process for accelerating the anionic polymerization of lactams having from 5 to 13 ring members in the presence of alkaline polymerization catalyst and an activator at from 80° to 200° C. the improvement which comprises using a compound having the formula:

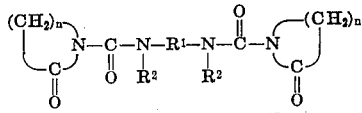

in which $n$ denotes one of the integers from 2 to 11, $R^1$ denotes a biphenylene group and $R^2$ denotes a phenyl or alkyl radical having 1 to 10 carbon atoms, as activators.

2. A process as claimed in claim 1 wherein a compound having the formula:

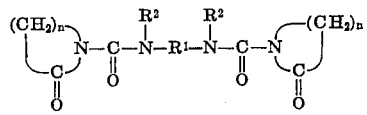

in which $n$ denotes the integer 5, 6 or 7 is used as activator.

3. A process as claimed in claim 1 wherein bis-(caprolactam-N-carboxylic acid)-N,N'-diphenyl-biphenylenediamide-4,4' is used as activator.

4. A process as claimed in claim 1 wherein the activator is used in an amount of 0.1 to 15 percent with reference to the weight of lactam.

* * * * *